June 2, 1953
R. A. NEAL
2,640,316
IGNITION APPARATUS FOR TURBOJET AFTERBURNERS
Filed Nov. 7, 1949
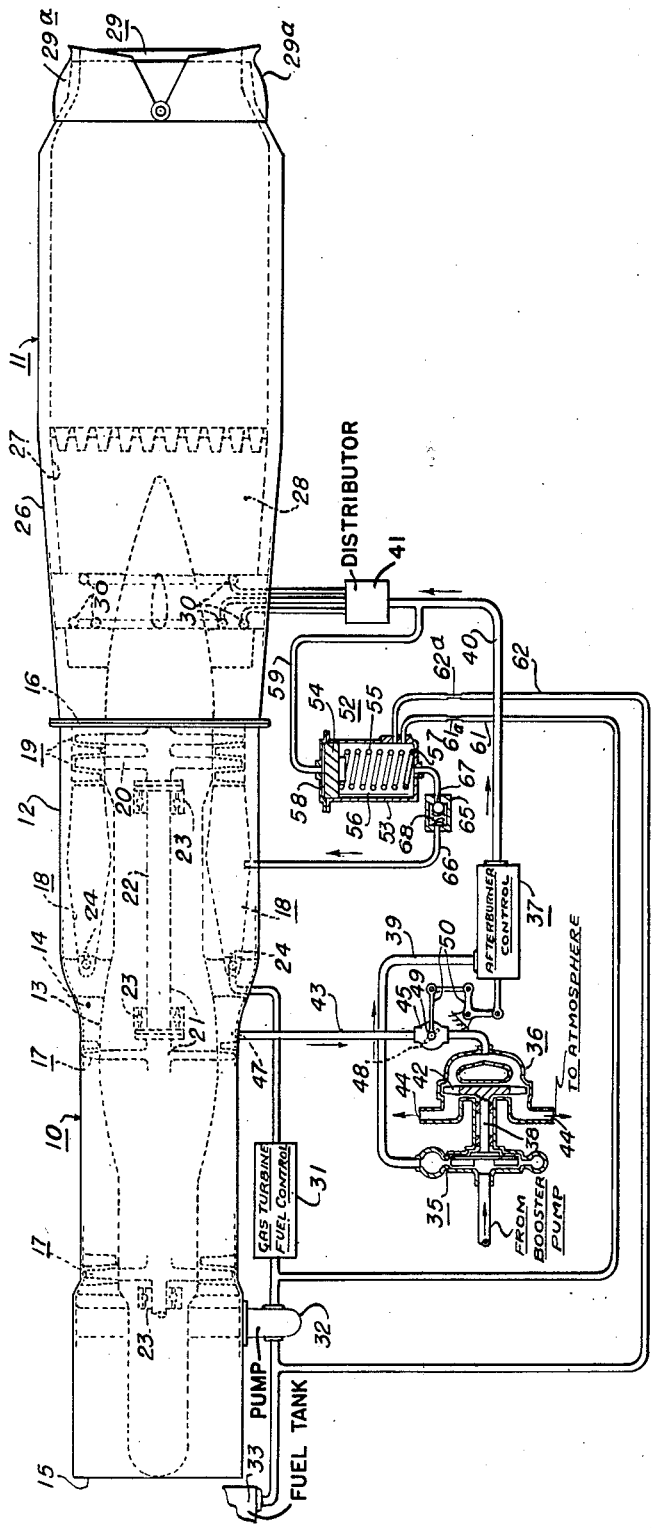
INVENTOR
ROBERT A. NEAL
BY
Ralph T. French
ATTORNEY.

Patented June 2, 1953

2,640,316

UNITED STATES PATENT OFFICE 2,640,316

IGNITION APPARATUS FOR TURBOJET AFTERBURNERS

Robert A. Neal, Media, Pa., assignor to Westinghouse Electric Corporation, East Pittsburgh, Pa., a corporation of Pennsylvania Application November 7, 1949, Serial No. 125,958

5 Claims. (Cl. 60—35.6)

1

This invention relates to gas turbine power plants, and more particularly to an aviation gas turbine power plant equipped with afterburner apparatus.

It has been proposed to equip an aviation turbojet engine with thrust augmentor or afterburner apparatus, which is adapted to be rendered operative under suitable conditions for burning additional fuel in the mixture of air and exhaust gases discharged from the usual turbine, thereby increasing the thrust energy available upon discharge of the motive fluid through the jet nozzle of the engine. The supply of fuel to such an afterburner may be controlled by a suitable auxiliary fuel system, such as that disclosed in Patent 2,506,611 of Robert A. Neal and Carl L. Sadler, Jr., issued on May 9, 1950 and assigned to the assignee of the present invention. In order to render the afterburner apparatus operable at will, it is desirable to provide ignition means cooperative with the separate fuel system, which will not add appreciably to the weight and complexity of the engine control equipment. It is a principal object of the present invention to provide reliable ignition means of this character, wherein the addition of heavy accessories or electrical elements such as spark plugs and coils is avoided.

Another object of the invention is the provision of improved control means for a gas turbine afterburner which will be operative to effect ignition of the fuel supplied thereto from the main combustion apparatus of the engine.

A further object of the invention is the provision of means for effecting ignition of the fuel and air mixture in the afterburner by introducing therein a mass of material initially rendered incandescent in the main combustion chamber.

A feature of the invention comprises the provision, in a turbojet engine, of means for initiating operation of the afterburner by injecting a predetermined excess quantity of fuel into the main combustion chamber, thereby causing a burning stream of fuel to pass momentarily through the turbine blading and into the afterburner for igniting the fuel supplied thereto from the afterburner fuel system.

These and other objects are effected by my invention as will be apparent from the following description and claims taken in connection with the accompanying drawing, forming a part of this application, in which:

The single figure is a diagrammatic elevational view of typical turbojet and afterburner apparatus, having associated therewith ignition equipment constructed in accordance with the invention.

As shown in the drawing, the power plant may comprise a turbojet engine 10 and tailburner apparatus 11, both of which have substantially cylindrical casing structures mounted in coaxial alignment and adapted to be supported in the fuselage or wing of an aircraft (not shown). The turbojet engine 10 includes an outer casing 12 and an inner core structure generally indicated at 13, which form an annular passageway 14 extending longitudinally through the engine from a forwardly directed air intake opening 15 to a rearwardly disposed turbine discharge passage 16. Operating elements of the turbojet engine are mounted in axial alignment to minimize frontal area, and include an axial-flow compressor 17, an annular combustion apparatus 18, and a turbine 19, the rotor 20 of which is operatively connected to the rotor 21 of the compressor through the medium of a common shaft 22 that is suitably journaled within the core structure 13, on strut supported bearings generally indicated at 23. In operation, air entering the intake opening 15 is compressed by the compressor 17 and delivered to the combustion apparatus 18, where fuel supplied by way of nozzles 24 is burned to form hot motive fluid, which is expanded through the turbine 19 for driving the compressor, and thence supplied through the discharge passage 16 to the afterburner apparatus 11.

The afterburner apparatus 11 comprises a generally cylindrical outer casing 26, the forward end of which may be bolted or otherwise secured to the rearmost section of the turbojet outer casing structure 12. Mounted in the casing 26 is a tubular combustor or casing section 27, in which is formed an auxiliary combustion chamber 28, which communicates with the turbine discharge passage 16 and terminates in a discharge opening or nozzle 29, the flow area of which may be controlled by suitable movable tailpiece members 29a. Suitable fuel nozzle apparatus 30 is mounted in the chamber 28. It will be understood that fuel supplied by way of the nozzle apparatus 30 is burned in the heated gas and air mixture exhausted from the turbojet unit 10 to provide additional thrust energy for propelling the aircraft upon final discharge of the resultant motive fluid to atmosphere through the variable nozzle 29.

Any desired engine fuel control equipment may be employed for supplying fuel under pressure to the annular combustion apparatus 18 during operation of the power plant. In the drawing, fuel control apparatus 31 and an engine driven fuel pump 32 are diagrammatically illustrated, it being understood that this apparatus will be suitably constructed and arranged to effect metering of fuel under pressure from a fuel source 33 to the combustion apparatus 18 in accordance with engine fuel requirements, in the usual well known manner.

In the schematic arrangement illustrated in the drawing, fuel is supplied to the afterburner 11 under control of apparatus comprising centrifugal afterburner fuel pump 35 of relatively high capacity, an air turbine 36 operatively connected thereto, and suitable control apparatus 37, which may comprise mechanism constructed and arranged to effect automatic regulation of the flow of fuel to the afterburner, such as that disclosed in the coppending patent hereinbefore identified. The centrifugal fuel pump 35 may be of any suitable construction, and is operative by the air turbine 36 through the medium of a drive shaft 38 to effect supply of fuel under pressure from a source (not shown), through a pipe 39 to the inlet of the control apparatus 37, the outlet of which is connected through a pipe 40 and a flow distributor 41 to the nozzles 30 of the afterburner 11. The distributor 41 may be of the construction disclosed in Patent 2,503,420, issued to A. H. Redding. It will be understood that the pump 35 is preferably operative to deliver fuel under greater pressure than is the pump 32.

The air turbine 36 comprises an annular casing having mounted therein a turbine wheel 42 which is operatively connected to the shaft 38. The turbine wheel 42 is adapted to be driven by compressed air supplied from the engine compressor 17 by way of an inlet pipe 43 and discharged through atmospheric communications 44. A supply valve device 45 is interposed in the pipe 43 and is arranged for automatic operation by the afterburner control apparatus 37 to control the supply of air to the turbine 36 from a high pressure discharge outlet 47 of the compressor 17. The supply valve device 45 may be of any desired construction, and in the illustrated form comprises a casing containing a butterfly valve element 48 pivotally mounted on a pin 49 having an operating linkage 50 connected to suitable actuating mechanism of the control equipment 37. The afterburner control apparatus 37 is adapted to include a suitable fuel valve (not shown) which may be operatively connected, along with the linkage 50, to a manually controlled throttle lever (not shown), movement of the lever into its afterburning position serving to open this fuel valve and to actuate the linkage 50 to open air valve 48, so that the turbine driven pump 35 will initiate supply of fuel under pressure by way of the pipe 39, past the open fuel valve just mentioned, and through pipe 40 to the afterburner nozzles 30. It will be understood that since the invention does not involve features of construction of the afterburner control system 37, such details are advisedly omitted from the drawing, in order to avoid unnecessary complication of the disclosure of the invention.

According to the invention, an ignition fuel injection device 52 is provided for facilitating initial operation of the afterburner, comprising a cylinder 53 containing a movable member such as a piston 54, which is normally maintained in an inoperative position as shown by the pressure of a coil spring 55 that is interposed in a chamber 56 between the piston and an end wall 57 of the cylinder. The piston is subject on one side to the pressure of fuel in an upper chamber 58 communicating through a pipe 59 with the afterburner fuel supply pipe 40. The opposite or spring side of the piston is subject to the pressure of fuel in the cylinder chamber 56, which is normally filled with fuel constantly supplied thereto through a pipe 61 communicating with the discharge oulet of the engine fuel pump 32. A return pipe 62 is provided for maintaining communication between the chamber 56 and the inlet side of the pump 32, and both pipes 61 and 62 are equipped with suitable restrictions or choke fittings 61a and 62a, respectively, so that fuel can be circulated through the chamber 56 at a controlled rate to minimize accumulation of air.

A control valve device 65 is associated with the fuel injection device 52 for controlling a discharge communication from the chamber 56 through a conduit or igniter tube 66 to the combustion apparatus 18, preferably at a point intermediate the ends of the usual combustion chamber, as indicated in the drawing. The valve device 65 may comprise a casing containing a valve element 67 which is urged toward a seat under the force of a coil spring 68.

When the afterburner is to be rendered operative, the control apparatus 37 is set in operation by advancing the usual throttle lever (not shown) to afterburning position, such operation serving to actuate the linkage 50 and valve 49, thereby effecting supply of compressed air to the turbine 36, and also to open communication between pipes 39 and 40. The high capacity fuel pump 35 is thus operated to supply fuel under suitable predetermined pressure through the pipe 39 and through communications established in the control apparatus 37 to the nozzle pipe 40, from which fuel is fed through distributor 41 to nozzles 30. Upon the resultant increase in pressure of fuel acting in the chamber 58, the piston 54 is rapidly moved downwardly against the force of the spring 55, thus displacing fuel from the chamber 56, the fuel being forced past the valve element 67, which is unseated against the pressure of its spring 68, and thence through the conduit 66 into the combustion chamber of apparatus 18. It will be understood that the restricted orifices 61a and 62a will sufficiently impede back flow through the pipes 61 and 62 to cause substantially all of the fuel to be expelled from the chamber 56 by way of the conduit 66.

The volume of fuel thus suddenly injected into the combustion apparatus 18 exceeds that which can normally be completely oxidized therein before the gas mixture is swept out through the blading of the turbine 19, so that a stream of incandescent or burning fuel is quickly carried past the turbine into the chamber 28 of the afterburner apparatus 11, igniting the fuel supplied thereto by way of the nozzles 30. The apparatus 52 has a "one shot" or single operational cycle, since the cylinder 53 cannot be recharged until the afterburner pump 35 is shut off, normally by retarding the throttle out of afterburner range, after which the pump may be started again. It is believed that this feature of operation is desirable to prevent injection of too much fuel into the engine, in a manner that might cause burning out of the turbine nozzles downstream of the igniter tube 66.

It will be apparent from the foregoing description of a preferred embodiment of the invention, that the additional apparatus needed for effecting ignition of fuel in the afterburner may be of simple light-weight construction, and that the combination of the elements of the improved ignition apparatus with the elements of the usual fuel system may effectively be accomplished without necessitating extensive modifications of existing equipment.

While I have shown my invention in but one form, it will be obvious to those skilled in the art that it is not so limited, but is susceptible of various changes and modifications without departing from the spirit thereof.

What I claim is:

1. In a gas turbine power plant having combustion apparatus normally operative for supplying hot motive fluid to the turbine and an afterburner for receiving fluid exhausted from said turbine, said afterburner being remotely disposed relative to the normal combustion zone of said combustion apparatus, the combination of fuel control means operative for supplying fuel to said afterburner, and ignition means operative upon initial operation of said fuel control means to inject a predetermined excess quantity of combustible matter into said combustion apparatus, whereby an incandescent mass is momentarily carried through said turbine into said afterburner for igniting the fuel therein, said ignition means comprising a cylinder connected to said combustion apparatus, charging means operative to maintain a charge of combustible matter in said cylinder, and ejector means actuated upon operation of said fuel control means for displacing said combustible matter from said chamber into said combustion apparatus.

2. In a gas turbine power plant having combustion apparatus normally operative for supplying hot motive fluid to the turbine and an afterburner for receiving motive fluid exhausted from said turbine, said afterburner being remotely disposed relative to the normal combustion zone of said combustion apparatus, first fuel control means normally operative to supply fuel under pressure to said combustion apparatus including first nozzle means connected to said combustion apparatus, second fuel control means intermittently operative to supply fuel under pressure to said afterburner and including second nozzle means remote from said first nozzle means and connected to said afterburner, and ignition means for said afterburner including third nozzle means connected to said combustion apparatus and a fuel injector device responsive to an increase in pressure of fuel supplied by said second fuel control means to inject an excess quantity of fuel through said third nozzle means into said combustion apparatus, whereby an elongated flame is propagated therefrom past said turbine and into said afterburner for igniting the fuel supplied thereto by said second fuel control means.

3. In a gas turbine power plant having combustion apparatus normally operative for supplying hot motive fluid to the turbine and an afterburner remote from said combustion apparatus for receiving fluid exhausted from said turbine, a pump, first fuel control means normally operative to supply fuel under pressure from said pump to said combustion apparatus, a booster pump, second fuel control means intermittently operative to supply fuel under pressure from said booster pump to said afterburner, a cylinder normally supplied with fuel from the first-named pump and connected to said combustion apparatus, a normally closed spring-pressed check valve interposed in the communication from said cylinder to said combustion apparatus, a piston operatively mounted in said cylinder and subject on one side to the pressure of fuel therein and a chamber on the opposite side of said piston connected to said second fuel control means, said piston being responsive to an increase in pressure of fuel supplied from said second control means for suddenly ejecting fuel from said cylinder past said check valve into said combustion apparatus, whereby an elongated flame is propagated therefrom past said turbine and into said afterburner for igniting the fuel supplied thereto from said second fuel control means.

4. In a gas turbine power plant having a compressor, combustion apparatus for burning fuel in the presence of air under pressure delivered by said compressor, a turbine operative by motive fluid from said combustion apparatus for driving said compressor, and an afterburner remote from said combustion apparatus and intermittently operative for burning additional fuel in gases downstream of said turbine, fuel system comprising, in combination, a main fuel pump, engine control means operative to effect continuous supply of fuel under pressure from said main pump to said combustion apparatus, an afterburner fuel pump having a greater discharge pressure than that of the main pump, afterburner control means operative to effect supply of fuel under pressure from said afterburner pump to said afterburner, an auxiliary fuel reservoir normally containing a predetermined quantity of fuel supplied from said main pump, and means including a communication from said reservoir to said combustion apparatus and a piston responsive to an increase in pressure of fuel delivered by said afterburner pump for effecting rapid discharge of fuel from said reservoir into said combustion apparatus, whereby an ignited stream of fuel is carried therefrom through the turbine into said afterburner.

5. In a gas turbine power plant having a compressor, combustion apparatus for burning fuel in the presence of air under pressure delivered by said compressor, a turbine operative by motive fluid from said combustion apparatus for driving said compressor, and an afterburner remote from said combustion apparatus and intermittently operative for burning additional fuel in gases downstream of said turbine, fuel system comprising, in combination, a main fuel pump, engine control means operative to effect continuous supply of fuel under pressure from said main pump to said combustion apparatus, an afterburner fuel pump, afterburner control means operative to effect supply of fuel under pressure from said afterburner pump to said afterburner and including a fuel supply conduit, an auxiliary fuel reservoir normally containing a predetermined quantity of fuel supplied from said main pump, a restricted supply communication connecting said reservoir to the discharge side of said main pump, a restricted return communication connecting said reservoir to the inlet side of said main pump, another communication including a check valve connecting said reservoir to said combustion apparatus, and a piston disposed in said reservoir and subject on one side to the pressure of fuel in said fuel supply conduit, said piston being operative in response to an increase in pressure of fuel delivered through said control means and said fuel supply conduit by said afterburner pump for effecting rapid discharge of said predetermined quantity of fuel from said reservoir past said check valve into said combustion apparatus, whereby an ignited stream of fuel is carried therefrom through the turbine into said afterburner.

ROBERT A. NEAL.

References Cited in the file of this patent

UNITED STATES PATENTS

| Number | Name | Date |
|---|---|---|
| 2,498,939 | Bobier | Feb. 28, 1950 |
| 2,506,611 | Neal et al. | May 9, 1950 |
| 2,520,967 | Schmitt | Sept. 5, 1950 |
| 2,566,373 | Redding | Sept. 4, 1951 |